US009173170B2

(12) United States Patent
Ding et al.

(10) Patent No.: US 9,173,170 B2
(45) Date of Patent: Oct. 27, 2015

(54) APPARATUS AND METHOD FOR ASYNCHRONOUS PEER-TO-PEER DISCOVERY

(71) Applicant: QUALCOMM Incorporated, San Diego, CA (US)

(72) Inventors: Gang Ding, San Diego, CA (US); Kiran Shagle Chikkappa, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 114 days.

(21) Appl. No.: 14/026,851

(22) Filed: Sep. 13, 2013

(65) Prior Publication Data

US 2015/0078197 A1    Mar. 19, 2015

(51) Int. Cl.
*H04W 52/02* (2009.01)
*H04W 48/16* (2009.01)
*H04W 8/00* (2009.01)
H04W 84/10 (2009.01)
H04W 84/18 (2009.01)

(52) U.S. Cl.
CPC .......... *H04W 52/0248* (2013.01); *H04W 8/005* (2013.01); *H04W 48/16* (2013.01); *H04W 52/0209* (2013.01); *H04W 52/0251* (2013.01); H04W 84/10 (2013.01); H04W 84/18 (2013.01)

(58) Field of Classification Search
CPC ............... H04W 48/16; H04W 52/02
See application file for complete search history.

(56) References Cited

U.S. PATENT DOCUMENTS

| 7,613,156 | B2 | 11/2009 | Rittle et al. |
| 8,320,398 | B2 | 11/2012 | Li et al. |
| 2007/0286136 | A1* | 12/2007 | Rittle et al. ............... 370/338 |
| 2009/0270030 | A1 | 10/2009 | Jia et al. |
| 2012/0191966 | A1* | 7/2012 | Jovicic et al. ............ 713/100 |
| 2013/0040573 | A1 | 2/2013 | Hillyard |
| 2013/0040574 | A1 | 2/2013 | Hillyard |

OTHER PUBLICATIONS

Braynard R., et al., "Extending Network Lifetime Using an Automatically Tuned Energy-Aware MAC Protocol", Jan. 1, 2006, Wireless Sensor Networks Lecture Notes in Computer Science;; LNCS, Springer, Berlin, DE, pp. 244-259, XP019027947, ISBN: 978-3-540-32158-3.
International Search Report and Written Opinion—PCT/US2014/055217—ISA/EPO—Mar. 13, 2015.
Liu J., et al., "Adaptive Device Discovery in Bluetooth Low Energy Networks", 2013 IEEE 77th Vehicular Technology Conference (VTC SPRING), IEEE, Jun. 2, 2013, pp. 1-5, XP032547987, ISSN: 1550-2252, DOI: 10.1109/VTCSPRING.2013.6691855 [retrieved on Dec. 20, 2013].

(Continued)

*Primary Examiner* — Pao Sinkantarakorn
(74) *Attorney, Agent, or Firm* — Loza & Loza LLP

(57) ABSTRACT

Apparatus and method are provided for performing asynchronous discovery among multiple peers in a wireless peer-to-peer (P2P) network. In an aspect of the disclosure, a peer selects a duty cycle C corresponding to a probability that the peer is in either a scanning state or an advertising state, rather than a sleeping state, wherein the duty cycle C is selected in accordance with a power consumption of the peer. The peer also selects a first probability $P_t$ for being in the advertising state, and performs an asynchronous discovery protocol in accordance with the duty cycle C and the first probability $P_t$.

34 Claims, 8 Drawing Sheets

(56) References Cited

OTHER PUBLICATIONS

Liu J., et al., "Energy Analysis of Device Discovery for Bluetooth Low Energy", 2013 IEEE 78th Vehicular Technology Conference (VTC FALL), IEEE, Sep. 2, 2013, pp. 1-5, XP032548414, ISSN: 1090-3038, DOI: 10.1109/VTCFALL.2013. 6692181 [retrieved on Dec. 22, 2013].

Liu J., et al., "Modeling and performance analysis of device discovery in Bluetooth Low Energy networks", Global Communications Conference (GLOBECOM), 2012 IEEE, IEEE, Dec. 3, 2012, pp. 1538-1543. XP032374889, DOI: 10.1109/GLOCOM.2012. 6503332, ISBN: 978-1-4673-0920-2.

Liu J., et al., "Modeling Neighbor Discovery in Bluetooth Low Energy Networks", IEEE Communications Letters, IEEE Service Center, Piscataway, NJ, US, vol. 16, No. 9, Sep. 1, 2012, pp. 1439-1441, XP011461895, ISSN: 1089-7798. DOI: 10.1109/LCOMM. 2012.073112.120877.

* cited by examiner

APPARATUS AND METHOD FOR ASYNCHRONOUS PEER-TO-PEER DISCOVERY

TECHNICAL FIELD

Aspects of the present disclosure relate generally to wireless communication systems, and more particularly, apparatus and method for peer-to-peer wireless communications.

BACKGROUND

A peer-to-peer (P2P) wireless network is a distributed network architecture in which a number of peers or nodes can communicate with each other without a centralized controller or server (e.g., an access point or a base station). Examples of a P2P device (peer) include a cellular phone, a smart phone, a session initiation protocol (SIP) phone, a laptop, a notebook, a netbook, a smartbook, a smartwatch, a personal digital assistant (PDA), a satellite radio, a global positioning system (GPS) device, a multimedia device, a video device, a digital audio player (e.g., MP3 player), a camera, a game console, a sensor, or any other similar functioning device with P2P wireless communication capability. A peer can supply resources to, or consume resources from, other peers.

Before the peers can communicate with each other and form a P2P network, a peer needs to discover other peers first according to a discovery protocol. Two categories of discovery protocol are synchronous discovery and asynchronous discovery. Synchronous discovery protocols typically utilize a global clock, and all peers can wake up periodically or at a predetermined time (e.g., at substantially the same time) in reference to a timing signal from the global clock in order to discover each other.

However, in some scenarios or applications, it may not be desirable or practical to provide a global clock or timing signal thereof. In such cases, an asynchronous discovery protocol may be used when a global clock is not available or desirable. In an asynchronous discovery protocol, a peer may periodically (or at a predetermined time) wake up to scan for other peers in its communication range. If the peer wakes up more frequently and/or scans for a longer period, the probability of finding another peer will be increased at the expense of increased power consumption of the peer. On the other hand, reducing the frequency and/or duration of scanning can reduce power consumption of the peer.

While some existing wireless communication standards support asynchronous discovery (e.g., Wi-Fi Direct and Bluetooth Low Energy), they only work for two peers discovering each other. It is desirable to advance and enhance the state of the art in P2P wireless network with three or more peers.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the disclosure provides a method operable at a peer in a wireless peer-to-peer (P2P) network. The method includes selecting a duty cycle C corresponding to a probability that a peer is in either a scanning state or an advertising state, rather than a sleeping state, wherein the duty cycle C is selected in accordance with a power consumption of the peer. The method further includes selecting a first probability $P_t$ for being in the advertising state, and performing an asynchronous discovery protocol in accordance with the duty cycle C and the first probability $P_t$.

Another aspect of the disclosure provides a peer in a wireless peer-to-peer (P2P) network. The peer includes means for selecting a duty cycle C corresponding to a probability that a peer is in either a scanning state or an advertising state, rather than a sleeping state, wherein the duty cycle C is selected in accordance with a power consumption of the peer. The peer further includes means for selecting a first probability $P_t$ for being in the advertising state, and means for performing an asynchronous discovery protocol in accordance with the duty cycle C and the first probability $P_t$.

Another aspect of the disclosure provides a computer program product including a computer-readable storage medium that includes code for causing a peer in a wireless peer-to-peer (P2P) network to select a duty cycle C corresponding to a probability that the peer is in either a scanning state or an advertising state, rather than a sleeping state, wherein the duty cycle C is selected in accordance with a power consumption of the peer. The computer-readable storage medium further includes code for causing the peer to select a first probability $P_t$ for being in the advertising state, and perform an asynchronous discovery protocol in accordance with the duty cycle C and the first probability $P_t$.

Another aspect of the disclosure provides a peer operable in a wireless peer-to-peer (P2P) network. The peer includes at least one processor, a communication interface coupled to the at least one processor, and a memory coupled to the at least one processor.

The at least one processor is configured to: select a duty cycle C corresponding to a probability that the peer is in either a scanning state or an advertising state, rather than a sleeping state, wherein the duty cycle C is selected in accordance with a power consumption of the peer. The at least one processor is further configured to select a first probability $P_t$ for being in the advertising state, and perform an asynchronous discovery protocol in accordance with the duty cycle C and the first probability $P_t$.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Aspects of the present disclosure provide an asynchronous discovery protocol for peer-to-peer (P2P) wireless networks in which each peer runs the asynchronous discovery protocol locally without utilizing a central controller (or server), a global clock, or a timing signal thereof. It is desirable that the peers will have low power consumption because every peer may be designed to sleep as long as possible in order to conserve power. The discovery protocol is asynchronous because the peers do not share the same clock timing for discovery. Therefore, the peers generally do not wake up at the same time. In various aspects, the asynchronous discovery protocol can support asynchronous discovery among multiple peers (e.g., more than 2 peers) concurrently or simultaneously. A peer can select a duty cycle corresponding to a probability that the peer is in either a scanning state or an advertising state, rather than a sleeping state, and the peer selects a probability for being in the advertising state based on certain criteria discussed in more detail below. The duty cycle may be selected in accordance with a desired power consumption of the peer. For example, a shorter duty cycle can lead to reduced power consumption.

Figure 1:
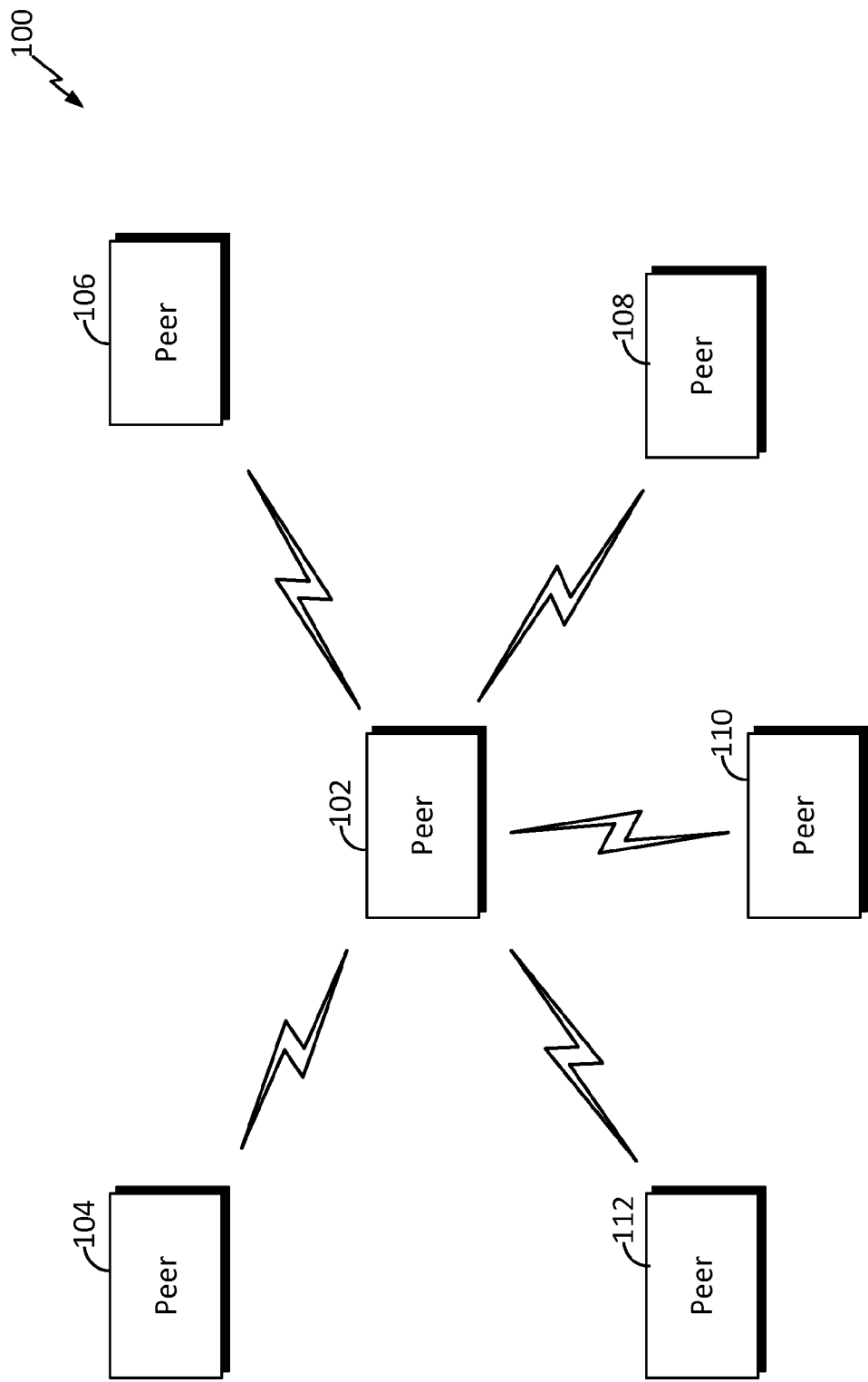
FIG. 1 is a block diagram conceptually illustrating a peer-to-peer (P2P) wireless network configured to support an asynchronous discovery protocol in accordance with aspects of the disclosure.

FIG. 1 is a block diagram conceptually illustrating a P2P wireless network 100 in accordance with aspects of the disclosure. The P2P wireless network 100 includes a number of peers (e.g., peers 102, 104, 106, 108, 110, and 112). These peers can communicate with each other using any suitable wirelessly communication methods or standards. By way of example and not limitation, the peers may communicate with each other via Bluetooth or Wi-Fi. In aspects of the disclosure, the peers may perform an asynchronous discovery protocol to discover each other. In an aspect, the asynchronous discovery protocol can support multiple peers (e.g., 3 or more peers) concurrently. The asynchronous discovery protocol will be described in more detail below.

Figure 2:
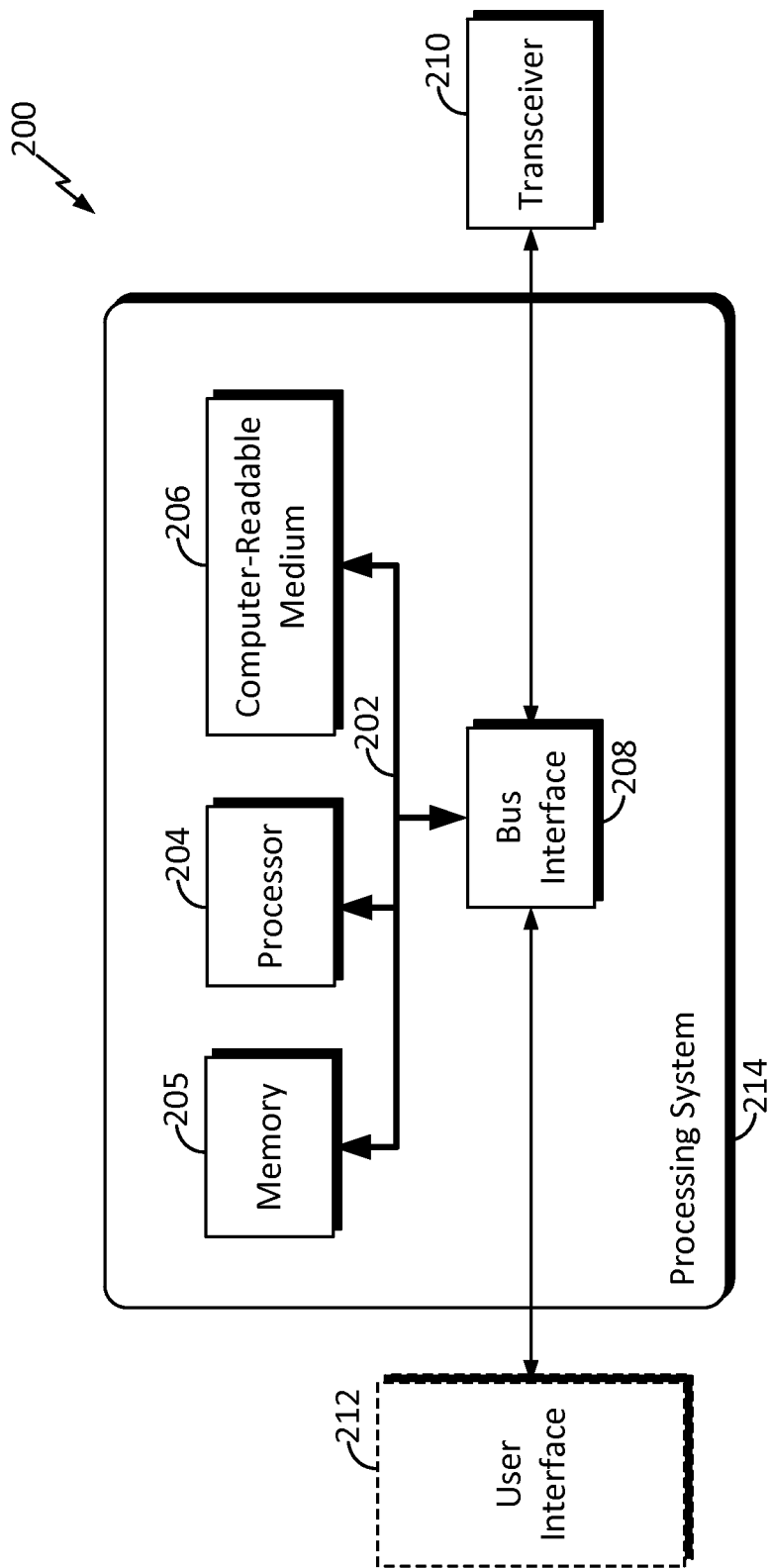
FIG. 2 is a block diagram illustrating an example of a hardware implementation for an apparatus employing a processing system in accordance with an aspect of the disclosure.

FIG. 2 is a conceptual diagram illustrating an example of a hardware implementation for an apparatus 200 employing a processing system 214. In an aspect, any of the peers in FIG. 1 may be implemented with the apparatus 200. In accordance with various aspects of the disclosure, an element, or any portion of an element, or any combination of elements may be implemented with a processing system 214 that includes one or more processors 204. Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality, for example, an asynchronous discovery protocol in a wireless P2P network, described throughout this disclosure.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for wirelessly communicating with various other apparatus (e.g., other P2P peers in FIG. 1) over a transmission medium. Depending upon the nature of the apparatus, a user interface 212 (e.g., keypad, display, speaker, microphone, joystick) may also be provided.

The processor 204 is responsible for managing the bus 202 and general processing, including the execution of software stored on the computer-readable medium 206. The software, when executed by the processor 204, causes the processing system 214 to perform the various functions, for example, an asynchronous discovery protocol, described infra for any particular apparatus. The computer-readable medium 206 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
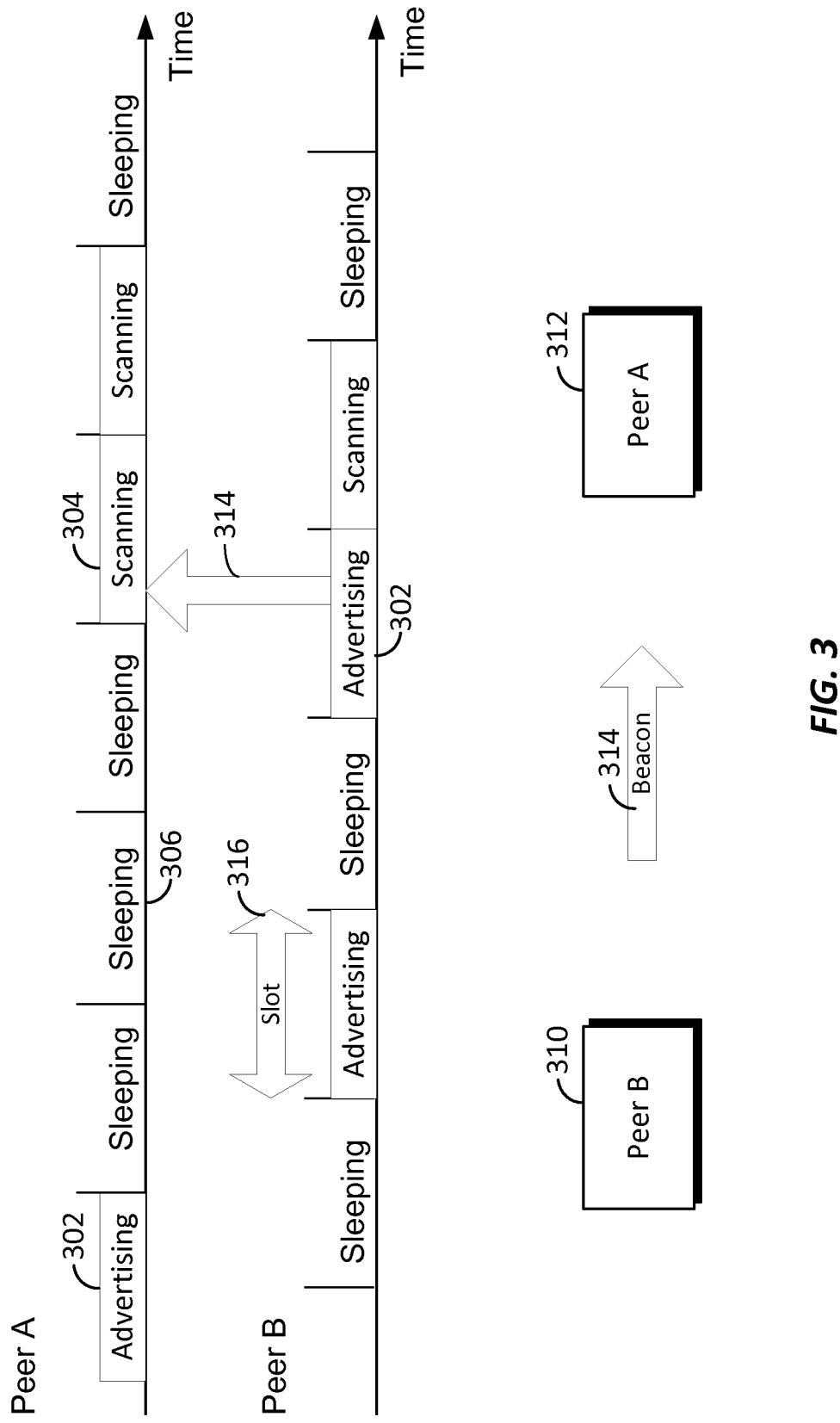
FIG. 3 is a diagram illustrating an asynchronous discovery protocol of a P2P wireless network in accordance with aspects of the disclosure.

FIG. 3 is a diagram illustrating an asynchronous discovery protocol for a P2P network in accordance with aspects of the disclosure. The P2P network may be the P2P network 100 of FIG. 1. Each peer (e.g., peer A and peer B) of the P2P network may be in any one of three different states: an Advertising state 302, a Scanning state 304, and a Sleeping state 306. For example, in the Advertising state 302, peer B 310 transmits an advertisement message 314 (e.g., by broadcasting a beacon for one or more times) in an attempt to be received by another peer (e.g., peer A 312). In the Scanning state 304, a peer listens for any advertisement messages (e.g., beacon transmissions) from other peers. In the Sleeping state 306, the peers save power, by neither transmitting an advertisement message nor listening for advertisement messages from other peers.

By way of example and not limitation, peer A 312 is said to discover peer B 310 when peer A, in a Scanning state 304, successfully receives an advertisement message 314 (e.g., beacon) from peer B 310 that is in an Advertising state 302. In an aspect of the disclosure, which state the peer stays in can be dependent on three probability parameters: $P_t$, $P_r$, and $P_s$, respectively. Here, the parameter $P_r$ represents the probability that a peer may transition into the Scanning state 304 in order to receive advertisement transmissions from other peers. The parameter $P_s$ represents the probability that a peer may transition into the Sleeping state 306, to save power. The parameter $P_t$ represents the probability that a peer may transition into the Advertising state 302, to transmit an advertisement message or beacon.

In various aspects of the disclosure, these parameters ($P_t$, $P_r$, and $P_s$) can be optimized by determining their appropriate values to maximize the expected number of successful discoveries. In the P2P network, each peer runs an asynchronous discovery algorithm utilizing its own clock, and the clock time is not synchronized among the peers. In the asynchronous discovery algorithm, time is divided into suitable time units or slots 316. At the beginning of each time unit, each peer determines which state (Sleeping, Advertising, or Scanning) into which it will enter, in accordance with the above-described probabilities ($P_t$, $P_r$, and $P_s$).

Optimizing Frequency of Advertising Beacon Transmission

A duty cycle C of a peer may be determined based on a desired power requirement at that particular peer. For example, the duty cycle C is equal to a probability that the peer is in either a scanning state or an advertising state, rather than a sleeping state. In general, the higher the duty cycle C, the more power the peer will consume. Therefore, the duty cycle C is defined as the probability that the peer is not in the Sleeping state 306 (i.e., that the peer is in either one of the Scanning state 304 or the Advertising state 302). That is, the duty cycle C may be defined as: $C=P_t+P_r=1-P_s$. With the duty cycle C being given or chosen, the asynchronous discovery algorithm generally seeks to find an optimal value of $P_t$, in order to maximize the expected number of discoveries, denoted as E(H). Here, H is a random variable denoting the number of distinct discoveries h among N peers, and N represents the number of peers that can hear each other wirelessly (i.e., within wireless communication range).

With the above parameters defined, the probability distribution of H can be defined by Equation (1).

$$Pr(H=h) = \binom{N-1}{h} NP_r^h P_s^{N-1-h} P_t \quad (0 < h < N) \qquad \text{Equation (1)}$$

Thus, the expected value of H can be defined by Equation (2).

$$E(H) = N(N-1)(C-P_t)P_t(1-P_t)^{N-2} \qquad \text{Equation (2)}$$

In order to maximize E(H), the optimal value ($P_t^*$) of parameter $P_t$ can be defined by Equation (3).

$$P_t^* = \frac{\left(2 + CN - C - \sqrt{C^2(N-1)^2 + 4(1-C)}\right)}{2N} \qquad \text{Equation (3)}$$

Figure 4:
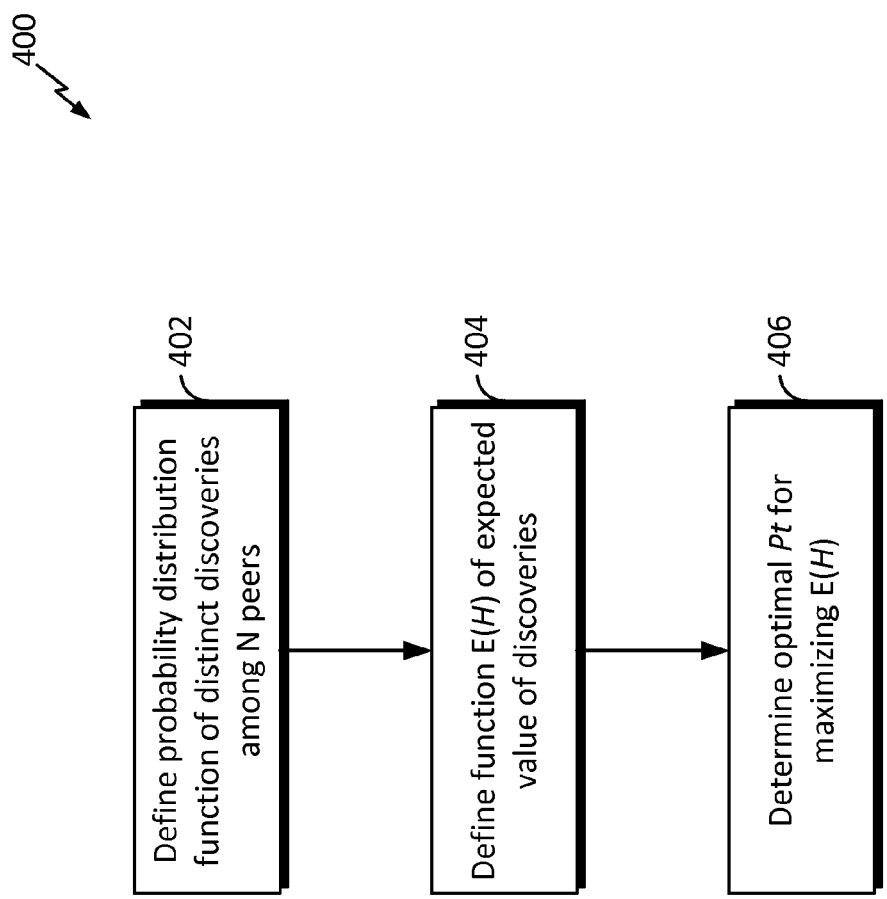
FIG. 4 is a flowchart illustrating an algorithm for optimizing discovery of a wireless peer in an asynchronous discovery protocol in accordance with an aspect of the disclosure.

FIG. 4 is a flowchart illustrating an algorithm 400 for optimizing discovery of a wireless peer in an asynchronous discovery protocol in accordance with an aspect of the disclosure. The algorithm 400 may be performed by any of the peers in FIG. 1 or FIG. 3. In a step 402, a probability distribution function of distinct discoveries H of a peer among N peers is defined. For example, the probability distribution function may be Equation (1). Then in a step 404, a function E(H) of the expected value of discoveries of the peer is defined. For example, the function E(H) may be Equation (2). To maximize the value of the function E(H), the optimal value of the probability $P_t$ is determined in a step 406. For example, Equation (3) may be used to determine the optimal value $P_t^*$ of the parameter $P_t$. Based on the algorithm 400, a peer may optimize its probability of discovery in an asynchronous discovery protocol.

Prioritization Among Peers

In the above-described optimization of the parameter $P_t$, it is assumed that all peers utilize the same values for the parameters (i.e., same probabilities). For example, all peers have the same value of the optimized parameter $P_t$. However, it is possible that a peer may wish to advertise more frequently than other peers. For example, a peer may have fresher content that may be shared with other peers. The content can be any data information collected or generated by any peer. For example, a peer may receive some latest news which is not available to other peers yet; a peer may generate some user-specific content such as text messages, personal pictures, etc.; and a peer may have just updated some of the above-mentioned content that may have been shared with other peers before. By advertising more frequently, the probability of being discovered by another peer increases. Accordingly, the fresher content may be made available to other peers more rapidly.

In an aspect of the disclosure, a particular peer k (e.g., peer B 310) has fresher content. Therefore, the peer's parameters $P_t$ and $P_r$ may be modified in accordance with Equations (4) and (5) to increase its advertising time.

$$P_{tk} = P_t + \Delta \qquad \text{Equation (4)}$$

$$P_{rk} = P_r - \Delta \qquad \text{Equation (5)}$$

$$0 < \Delta \leq (C - P_t)$$

Where $P_{tk}$ is the probability of the peer being in the Advertising state, and $P_{rk}$ is the probability of the peer being in the Scanning state.

Thus, the probability distribution of the number of discoveries $H_1$ for peer k can be defined by Equation (6).

$$Pr(H_1 = h) = \qquad \text{Equation (6)}$$

$$\binom{N-2}{h-1}(N-1)P_r^{h-1}P_s^{N-1-h}P_t P_{rk} + \binom{N-2}{h}(N-1)$$

$$P_r^h P_s^{N-2-h} P_t P_s + \binom{N-1}{h} P_r^h P_s^{N-1-h} P_{tk} =$$

$$Pr(H = h) + \Delta \binom{N-1}{h} P_r^{h-1} P_s^{N-1-h}(P_r - hP_t) \quad (0 < h < N)$$

Thus, the expectation of $H_1$ can be defined by Equation (7).

$$E(H_1) = E(H) + \Delta(N-1)(1-P_t)^{N-3}[(1-P_t)P_r - (N-2)P_t P_r - (1-P_t)P_t] \qquad \text{Equation (7):}$$

While there is no closed-form optimal solution for $P_t$ to maximize $E(H_1)$, there are several proven properties of $P_t$ that are useful for system design. For example:

$Pr(H_1 = h) = Pr(H = h)$ when $h = h^*$, where $h^* = P_r/P_t$.

$Pr(H_1 = h) > Pr(H = h)$ when $h < h^*$, which implies that $H_1$ is better for discovering a smaller number of peers.

$E(H_1) = E(H)$ when $P_t = P_t^*$, which means that the maximum expected number of discovery remains the same for $H_1$.

$E(H_1) > E(H)$ when $P_t < P_t^*$, which means that a smaller $P_t$ may lead to a better result for $H_1$ in some cases.

Peer Algorithm

Based on the above prioritization approach, a peer may utilize the following algorithm to vary how frequently it transmits an advertisement beacon in accordance with a kind of "freshness" metric of content that the peer wishes to make available. One example of quantifying the freshness of content is to use the time that has passed since the creation of the content. Each content may have a time stamp corresponding to the time when it is first created so that the freshness can be measured by the difference between current time and the creation time; the larger the difference, the less fresh the content. In an aspect of the disclosure, each peer may choose a suitable duty cycle C in accordance with its desired power savings and discoveries. When a peer has fresh content, e.g., when certain content (e.g., new captured pictures) has been updated, that peer may increase its value of $P_t$, up to the value of the duty cycle C, while decreasing its value of $P_r$ to maintain the duty cycle C. As the freshness of the peer's content decays over time, the peer may gradually reduce its value of $P_t$, down to the value of $P_t^*$. Here, the smaller values of $P_t$ give larger values of $h^* = P_r/P_t$, implying a higher probability of discovery among peers.

Figure 5:
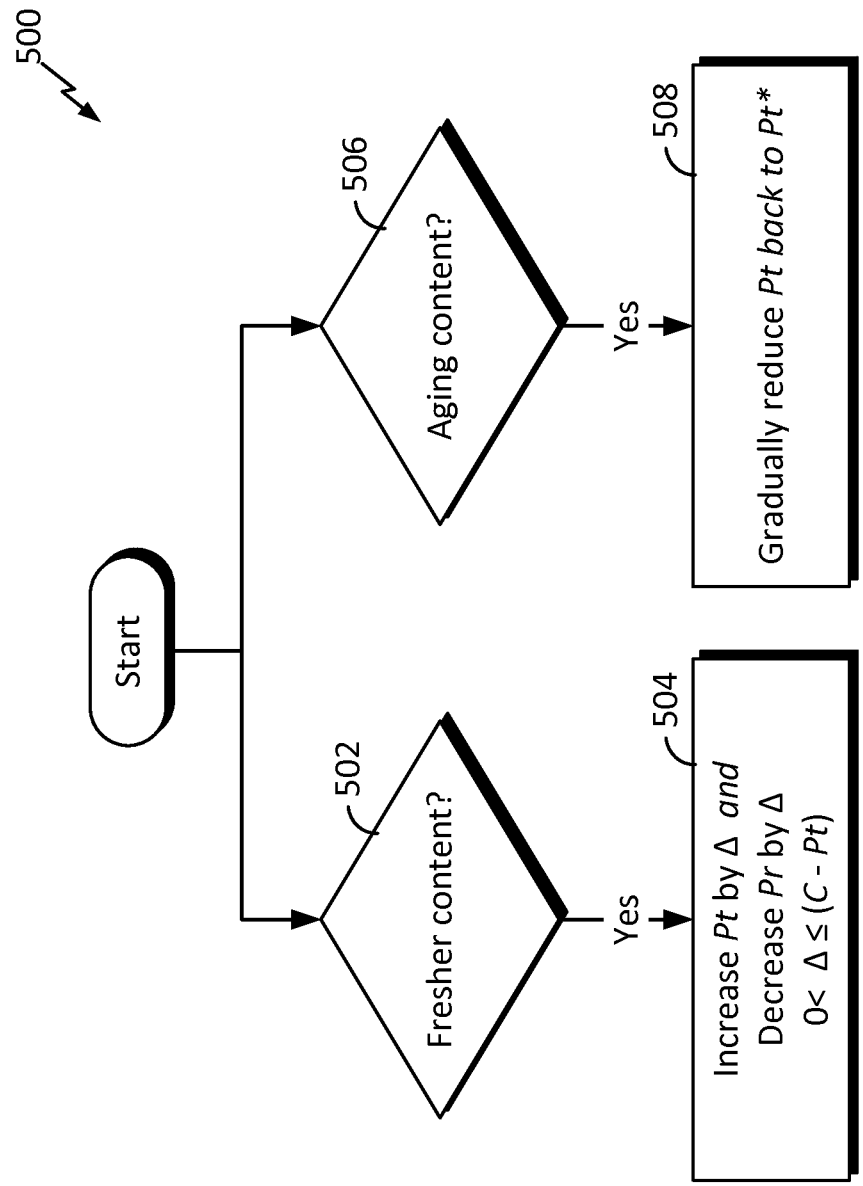
FIG. 5 a flowchart illustrating an algorithm for prioritizing peers based on content freshness in accordance with an aspect of the disclosure.

As shown in Equation (3) above, the value of the optimized $P_t^*$ is calculated by the peer, based upon the values of C and N. When N is unknown to a peer, that peer may utilize a conservative estimate (e.g., a larger value of N), which results in a smaller value of $P_t^*$. When the actual value of $P_t$ is smaller than $P_t^*$, it results in a larger $E(H_1)$ resulting in better discovery of fresher content from other peers. FIG. 5 is a flowchart illustrating an algorithm 500 for prioritizing peers based on content freshness in accordance with an aspect of the disclosure. The algorithm 500 may be performed by any of the peers in FIG. 1 and FIG. 3, for example. In a step 502, if it is determined that a peer has fresher content, the peer may increase the value of $P_t$ while decreasing the value of $P_r$ by a predetermined amount $\Delta$ in a step 504. In an aspect, the value of $P_t$ may be increased in accordance with Equation (4), and the value of $P_r$ may be decreased in accordance with Equation (5). In a step 506, if it is determined that the content of the peer is aging (i.e., content freshness decays with time), the peer may gradually reduce the value of $P_t$ down to $P_t^*$ as defined in Equation (3) in a step 508. It should be noted that while the algorithm 500 is illustrated in FIG. 5 in a particular order and sequence, the present disclosure is not limited as such. In other aspects, the various steps may be performed in different orders in sequence or parallel.

Figure 6:
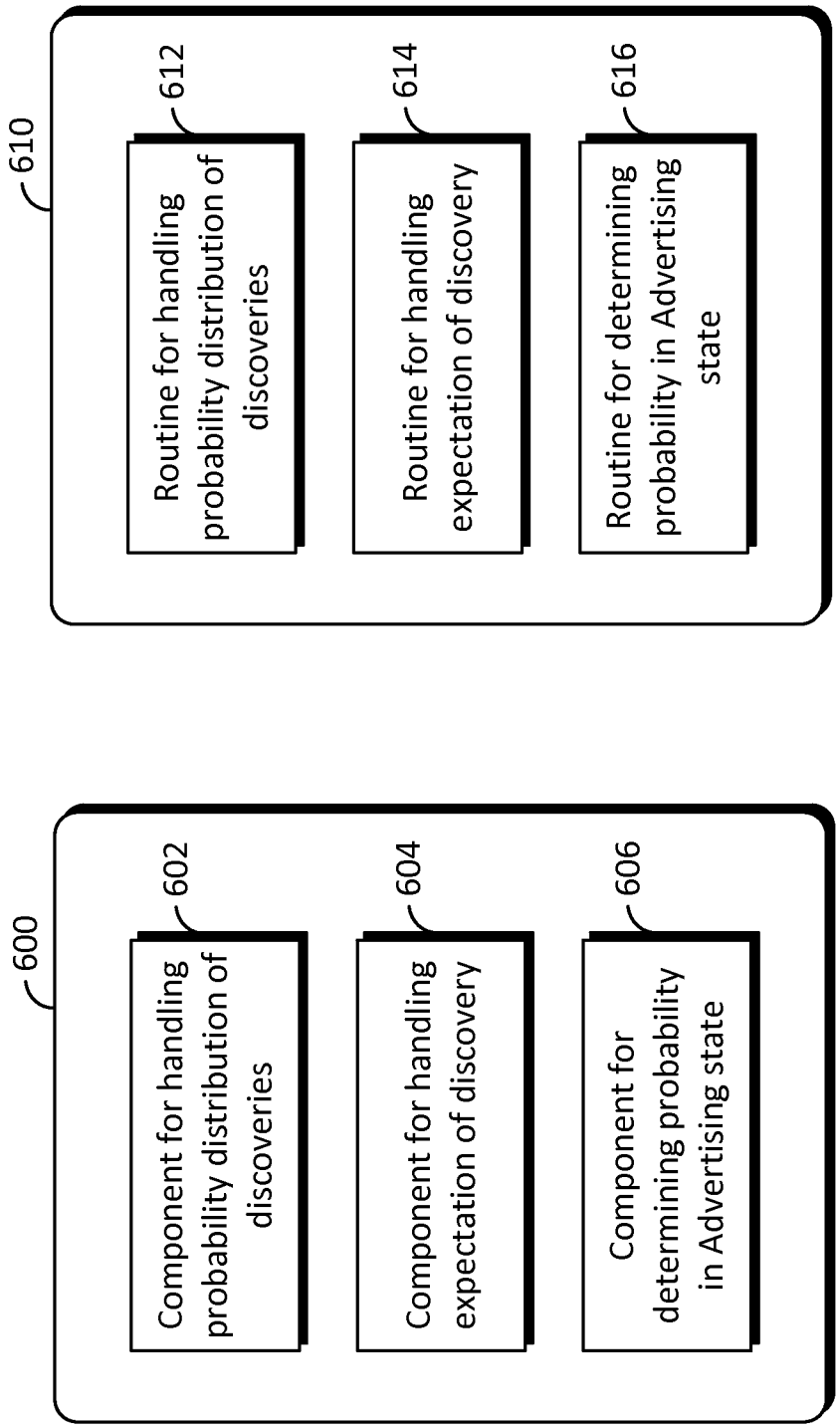
FIG. 6 a drawing conceptually showing a processor and a computer-readable medium, configured to perform an asynchronous discovery protocol in accordance with an aspect of the disclosure.

FIG. 6 is a drawing conceptually showing a processor 600 and a computer-readable medium 610, configured to perform an asynchronous discovery protocol as described above in reference to FIGS. 1-5. In an aspect of the disclosure, the processor 600 may be implemented as the processor 204, and the computer-readable medium 610 may be the computer-storage medium 206. The processor 600 includes a component 602 for handling probability distribution of discoveries, a component 604 for handling expectation of discovery, and a component 606 for determining probability of a peer in an Advertising state. In an aspect, the components 602, 604, and 606 may be utilized to perform the steps 402, 404, and 406 in FIG. 4, respectively. The storage medium 610 includes a routine 612 for handling probability distribution of discoveries, a routine 614 for handling expectation of discovery, and a routine 616 for determining probability of a peer in an Advertising state. In an aspect, the routines 612, 614, and 616 may be executed by a processor 600 to perform the steps 402, 404, and 406 of FIG. 4, respectively. In one aspect, the processor 600 and storage medium 610 may be configured to perform the algorithms 400 and 500 in FIGS. 4 and 5, for example, to change the probability $P_t$ for a peer based on content freshness.

Figure 7:
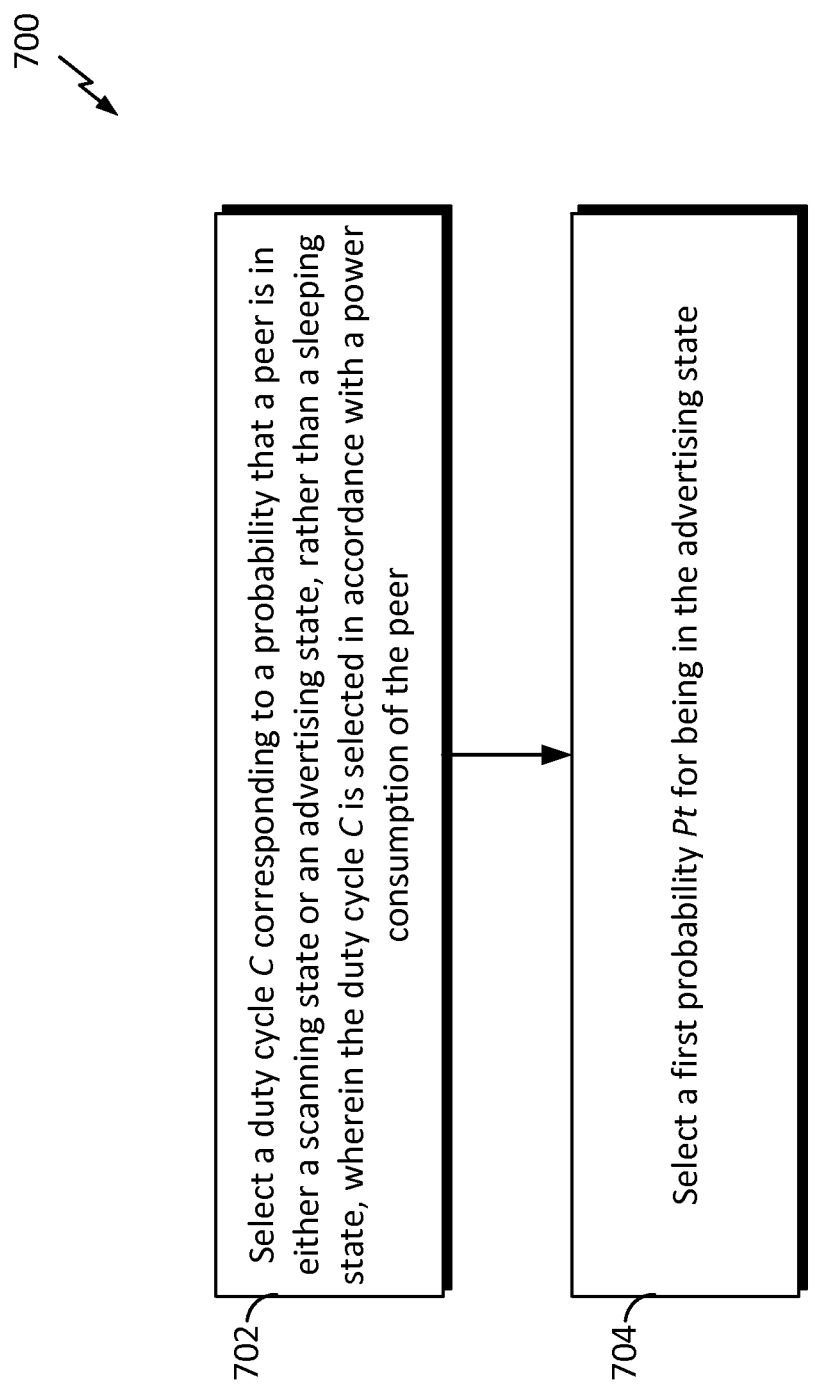
FIG. 7 is a flowchart illustrating a method of asynchronous P2P discovery operable at a peer in a wireless P2P network in accordance with an aspect of the disclosure.

FIG. 7 is a flowchart illustrating a method 700 of performing an asynchronous P2P discovery protocol operable at a peer in a wireless P2P network in accordance with an aspect of the disclosure. In one aspect, this asynchronous discovery protocol can allow three or more peers (e.g., peers 102, 104, 106 of FIG. 1) to perform asynchronous P2P discovery concurrently or simultaneously. In a step 702, a peer selects a duty cycle C corresponding to a probability that the peer is in either a Scanning state or an Advertising state, rather than a Sleeping state, wherein the duty cycle C is selected in accordance with a desired power consumption of the peer. For example, a longer duty cycle C will increase power consumption of the peer, while a shorter duty cycle C will decrease power consumption of the peer. Then in a step 704, the peer selects a first probability $P_t$ for being in the Advertising state. In various aspects, the method 700 may be performed in accordance with the disclosure set forth in reference to FIGS. 1-6.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As those skilled in the art will readily appreciate, various aspects described throughout this disclosure may be extended to other telecommunication systems, network architectures and communication standards. By way of example, various aspects may be extended to wireless systems such as IEEE 802.11 (Wi-Fi), Bluetooth, and/or other suitable systems. The actual telecommunication standard, network architecture, and/or communication standard employed will depend on the specific application and the overall design constraints imposed on the system.

Figure 8:
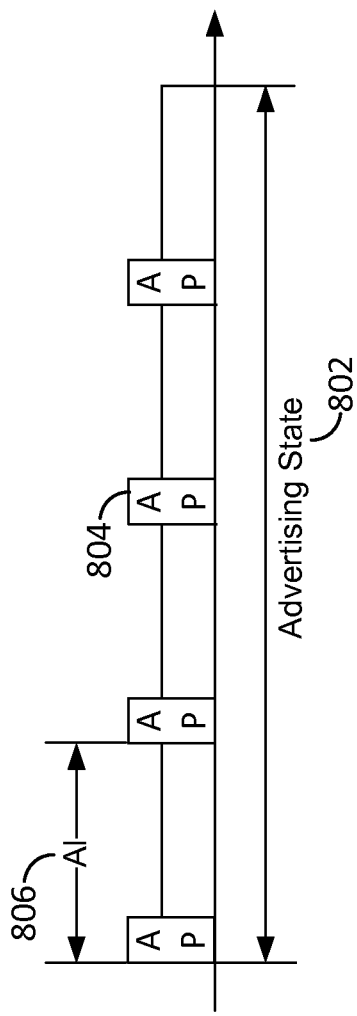
FIG. 8 is a diagram illustrating an implementation of an asynchronous discovery protocol at a peer using Bluetooth Low Energy (BLE) wireless interface in accordance with an aspect of the disclosure.

FIG. 8 is a diagram illustrating an implementation of an asynchronous discovery protocol at a peer using Bluetooth Low Energy (BLE) wireless interface in accordance with an aspect of the disclosure. When a peer (e.g., peer B 310) is in an advertising state 802, it may periodically send a number of advertisement packets (AP) 804 in an advertising channel. For example, the AP type is ADV_SCAN_IND. Other peers may request more information by sending a SCAN_REQ packet. At this point, no BLE connection request is allowed. The AP 804 is sent at the beginning of each Advertising Interval (AI) 806. In one aspect, each AP should be transmitted within 10 milliseconds (ms). In various aspects, the Advertising Interval 806 may be any multiple of 0.625 ms between 20 ms and 10.24 seconds. The time duration of the Advertising state 802 may include multiple AIs 806. The peer may control its BLE wireless interface through Host Controller Interface (HCI) commands to set advertising parameters and advertising data, and enable/disable advertising state.

Figure 9:
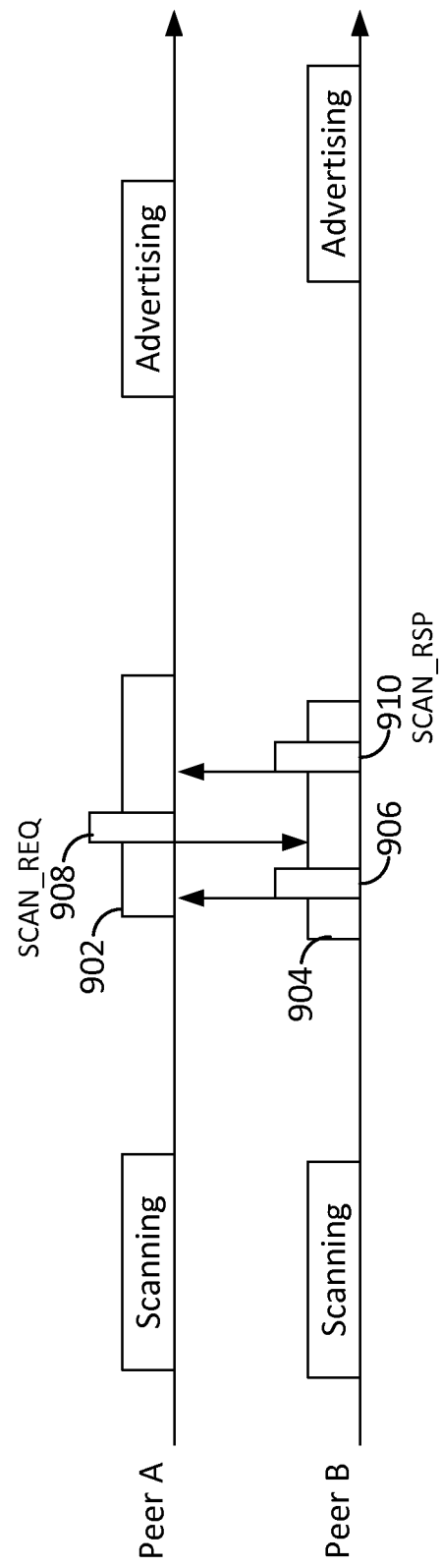
FIG. 9 is a diagram illustrating an asynchronous discovery protocol operable at a peer using a BLE wireless interface in accordance with an aspect of the disclosure.

FIG. 9 is a diagram illustrating an asynchronous discovery protocol operable at a peer using a BLE wireless interface in accordance with an aspect of the disclosure. A peer A may be scanning in a scanning state 902, and a peer B may be in an advertising state 904. Peer A may receive an advertisement packet 906 from peer B, and may choose to request more information by sending a request packet SCAN_REQ 908. Other than the advertising packet 906, peer B may also prepare a scan response packet SCAN_RSP 910 to provide up to 31 bytes of additional information upon request. The peer may control its BLE wireless interface through Host Controller Interface (HCI) commands to set scanning parameters and data, and enable/disable scanning state. It should be noted that the timing and duration of the scanning and adverting state in FIGS. 8 and 9 may be determined at each peer based on the algorithms 400 and 500 set forth above in accordance with aspects of the disclosure.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method operable at a peer in a wireless peer-to-peer (P2P) network, the peer being configured to discover other peers by utilizing an asynchronous discovery protocol comprising a scanning state, an advertising state, and a sleeping state in accordance with a duty cycle C, the method comprising:

determining the duty cycle C in accordance with a power consumption of the peer, wherein the duty cycle C corresponds to a first probability $P_t$ that the peer is in the advertising state and a second probability $P_r$ that the peer is in the scanning state;

determining the first probability $P_t$ in accordance with the duty cycle C and a number of peers N in communication range of the peer; and performing the asynchronous discovery protocol in accordance with the duty cycle C and the first probability $P_t$.

2. The method of claim 1, further comprising:

increasing the first probability $P_t$ in response to an availability of updated content at the peer for sharing with the other peers.

3. The method of claim 2, further comprising:

gradually decreasing the first probability $P_t$ as the updated content ages over time.

4. The method of claim 2, further comprising:

decreasing the second probability $P_r$ by an amount equal to an increased amount of the first probability $P_t$.

5. The method of claim 4, wherein the increased amount of the first probability $P_t$ is greater than zero, and less than or equal to $C-P_r$.

6. The method of claim 4, wherein the second probability $P_r$ is substantially equal to zero.

7. The method of claim 1, wherein the determining the first probability $P_t$ further comprises calculating:

$$P_t^* = \frac{\left(2 + CN - C - \sqrt{C^2(N-1)^2 + 4(1-C)}\right)}{2N}$$

wherein $P_t^*$ is a value of the first probability $P_t$ for maximizing an expected number of discoveries among peers, C is the duty cycle, and N is the number of peers.

8. The method of claim 1, wherein the asynchronous discovery protocol is configured to support three or more of the other peers concurrently.

9. The method of claim 1, wherein determining the first probability $P_t$ comprises determining the first probability $P_t$ such that an expected number of successful discoveries of the peers N in communication range of the peer is maximized.

10. The method of claim 1, further comprising estimating a value of N.

11. A peer in a wireless peer-to-peer (P2P) network, comprising:

means for discovering other peers by utilizing an asynchronous discovery protocol comprising a scanning state, an advertising state, and a sleeping state in accordance with a duty cycle C;

means for determining the duty cycle C in accordance with a power consumption of the peer, wherein the duty cycle C corresponds to a first probability $P_t$ that the peer is in the advertising state and a second probability $P_r$ that the peer is in the scanning state;

means for determining the first probability $P_t$ in accordance with the duty cycle C and a number of peers N in communication range of the peer, wherein the means for discovering comprises means for performing the asynchronous discovery protocol in accordance with the duty cycle C and the first probability $P_t$.

12. The peer of claim 11, further comprising:
means for increasing the first probability $P_t$ in response to an availability of updated content at the peer for sharing with the other peers.

13. The peer of claim 12, further comprising:
means for gradually decreasing the first probability $P_t$ as the updated content ages over time.

14. The peer of claim 12, further comprising:
means for decreasing the second probability $P_r$ by an amount equal to an increased amount of the first probability $P_t$.

15. The peer of claim 14, wherein the increased amount of the first probability $P_t$ is greater than zero, and less than or equal to $C-P_t$.

16. The peer of claim 14, wherein the second probability $P_r$ is substantially equal to zero.

17. The peer of claim 11, wherein the means for determining the first probability $P_t$ is configured to calculate:

$$P_t^* = \frac{\left(2 + CN - C - \sqrt{C^2(N-1)^2 + 4(1-C)}\right)}{2N}$$

wherein $P_t^*$ is a value of the first probability $P_t$ for maximizing an expected number of discoveries among peers, C is the duty cycle, and N is the number of peers.

18. The peer of claim 11, wherein the asynchronous discovery protocol is configured to support three or more of the other peers concurrently.

19. A non-transitory computer-readable storage medium comprising code for causing a peer in a wireless peer-to-peer (P2P) network to:
discover other peers by utilizing an asynchronous discovery protocol comprising a scanning state, an advertising state, and a sleeping state in accordance with a duty cycle C;
determine the duty cycle C in accordance with a power consumption of the peer, wherein the duty cycle C corresponds to a first probability $P_t$ that the peer is in the advertising state and a second probability $P_r$ that the peer is in the scanning state;
determine the first probability $P_t$ in accordance with the duty cycle C and a number of peers N in communication range of the peer; and
perform the asynchronous discovery protocol in accordance with the duty cycle C and the first probability $P_t$.

20. The computer-readable storage medium of claim 19, further comprising code for causing the peer to:
increase the first probability $P_t$ in response to an availability of updated content at the peer for sharing with the other peers.

21. The computer-readable storage medium of claim 20, further comprising code for causing the peer to:
gradually decrease the first probability $P_t$ as the updated content ages over time.

22. The computer-readable storage medium of claim 20, further comprising code for causing the peer to:
decrease the second probability $P_r$ by an amount equal to an increased amount of the first probability $P_t$.

23. The computer-readable storage medium of claim 22, wherein the increased amount of the first probability $P_t$ is greater than zero, and less than or equal to $C-P_t$.

24. The computer-readable storage medium of claim 22, wherein the second probability $P_r$ is substantially equal to zero.

25. The computer-readable storage medium of claim 19, further comprising code for causing the peer to calculate:

$$P_t^* = \frac{\left(2 + CN - C - \sqrt{C^2(N-1)^2 + 4(1-C)}\right)}{2N}$$

wherein $P_t^*$ is a value of the first probability $P_t$ for maximizing an expected number of discoveries among peers, C is the duty cycle, and N is the number of peers.

26. The computer-readable storage medium of claim 19, wherein the asynchronous discovery protocol is configured to support three or more of the other peers concurrently.

27. A peer operable in a wireless peer-to-peer (P2P) network and configured to discover other peers by utilizing an asynchronous discovery protocol comprising a scanning state, an advertising state, and a sleeping state in accordance with a duty cycle C, the peer comprising:
at least one processor;
a communication interface coupled to the at least one processor; and
a memory coupled to the at least one processor,
wherein the at least one processor is configured to:
determine the duty cycle C in accordance with a power consumption of the peer, wherein the duty cycle C corresponds to a first probability $P_t$ that the peer is in the advertising state and a second probability $P_r$ that the peer is in the scanning state;
determine the first probability $P_t$ in accordance with the duty cycle C and a number of peers N in communication range of the peer; and
perform, by utilizing the communication interface, the asynchronous discovery protocol in accordance with the duty cycle C and the first probability $P_t$.

28. The peer of claim 27, wherein the at least one processor is further configured to:
increase the first probability $P_t$ in response to an availability of updated content at the peer for sharing with the other peers.

29. The peer of claim 28, wherein the at least one processor is further configured to:
gradually decrease the first probability $P_t$ as the updated content ages over time.

30. The peer of claim 28, wherein the at least one processor is further configured to:
decrease the second probability $P_r$ by an amount equal to an increased amount of the first probability $P_t$.

31. The peer of claim 30, wherein the increased amount of the first probability $P_t$ is greater than zero, and less than or equal to $C-P_t$.

32. The peer of claim 30, wherein the second probability $P_r$ is substantially equal to zero.

33. The peer of claim 27, wherein the at least one processor is further configured to calculate:

$$P_t^* = \frac{\left(2 + CN - C - \sqrt{C^2(N-1)^2 + 4(1-C)}\right)}{2N}$$

wherein $P_t^*$ is a value of the first probability $P_t$ for maximizing an expected number of discoveries among peers, C is the duty cycle, and N is the number of peers.

34. The peer of claim 27, wherein the asynchronous discovery protocol is configured to support three or more of the other peers concurrently.

* * * * *